(12) United States Patent
Richardson

(10) Patent No.: US 8,579,233 B2
(45) Date of Patent: Nov. 12, 2013

(54) PIVOTABLE AERIAL REFUELING BOOM AND METHOD THEREFOR

(75) Inventor: Forrest Eugene Richardson, Wichita, KS (US)

(73) Assignee: The Boeing Company, Chicago, IL (US)

(*) Notice: Subject to any disclaimer, the term of this patent is extended or adjusted under 35 U.S.C. 154(b) by 293 days.

(21) Appl. No.: 12/869,532

(22) Filed: Aug. 26, 2010

(65) Prior Publication Data

US 2012/0049003 A1 Mar. 1, 2012

(51) Int. Cl.
*B64D 39/00* (2006.01)

(52) U.S. Cl.
USPC ..................................... 244/135 A

(58) Field of Classification Search
USPC .......................... 244/135 A, 135 R
See application file for complete search history.

(56) References Cited

U.S. PATENT DOCUMENTS

| | | | |
|---|---|---|---|
| 2,663,523 A | 12/1953 | Leisy | |
| 2,670,913 A | 3/1954 | Castor et al. | |
| 2,967,684 A | 1/1961 | Knecht | |
| 4,072,283 A * | 2/1978 | Weiland | 244/135 A |
| 4,129,270 A * | 12/1978 | Robinson et al. | 244/135 A |
| 4,586,683 A * | 5/1986 | Kerker | 244/135 A |
| 4,860,975 A * | 8/1989 | Schliesing et al. | 244/172.4 |
| 5,906,336 A * | 5/1999 | Eckstein | 244/135 A |
| 5,996,939 A * | 12/1999 | Higgs et al. | 244/135 A |
| 7,472,868 B2 * | 1/2009 | Schuster et al. | 244/135 A |

FOREIGN PATENT DOCUMENTS

EP 1762492 A2 3/2007

* cited by examiner

*Primary Examiner* — Tien Dinh
*Assistant Examiner* — Keith L Dixon
(74) *Attorney, Agent, or Firm* — Weiss & Moy, P.C.

(57) ABSTRACT

An aerial refueling system has a fluid conduit. A plurality of actuators is coupled to the fluid conduit and a refueling aircraft housing the aerial refueling system to move the fluid conduit in a three perpendicular axes system.

8 Claims, 3 Drawing Sheets

PIVOTABLE AERIAL REFUELING BOOM AND METHOD THEREFOR

BACKGROUND

Embodiments of this disclosure relate generally to an aerial refueling system, and more particularly, to a pivotable aerial refueling boom having six degrees of freedom.

In order to extend the flight range of certain aircraft, some aircraft can be designed with in-flight refueling or air-to-air refueling capabilities. One type of refueling system is a boom refueling system. The boom refueling system may include a rigid boom. The rigid boom may have a probe and nozzle at its distal end. The boom may include airfoils controlled by a boom operator stationed on the refueling aircraft. The airfoils may allow the boom operator to actively maneuver the boom with respect to a receiver aircraft, which flies in a fixed refueling position below and aft of the tanker aircraft.

Minimizing the boom cross-section during movement of the refueling boom may decrease aerodynamic drag. A desire to decrease the aerodynamic drag of the refueling boom may determine the overall size and shape of control surfaces used to move the refueling boom, which in turn dictates the size of the boom operating envelope.

Therefore, it would be desirable to provide a system and method that overcomes the above. The systems and methods described herein decrease the refueling boom cross-section during movement thereby reducing the need for larger-sized airfoil control surfaces.

SUMMARY

An aerial refueling system has a fluid conduit. A plurality of actuators is coupled to the fluid conduit and a refueling aircraft deploying the aerial refueling system to move the fluid conduit in a three perpendicular axes system.

An aerial refueling device has a fluid conduit. A pivot device is coupled to the fluid conduit to provide six degrees of freedom in movement for the fluid conduit.

An aerial refueling device has a first connector plate attached to a refueling aircraft. A plurality of actuators is pivotable coupled to the first connector plate. A second connector plate is pivotable coupled to the plurality of actuators. A fluid conduit is attached to the second connector plate. Movement of the plurality of actuators allows the fluid conduit to move in a three perpendicular axes system.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
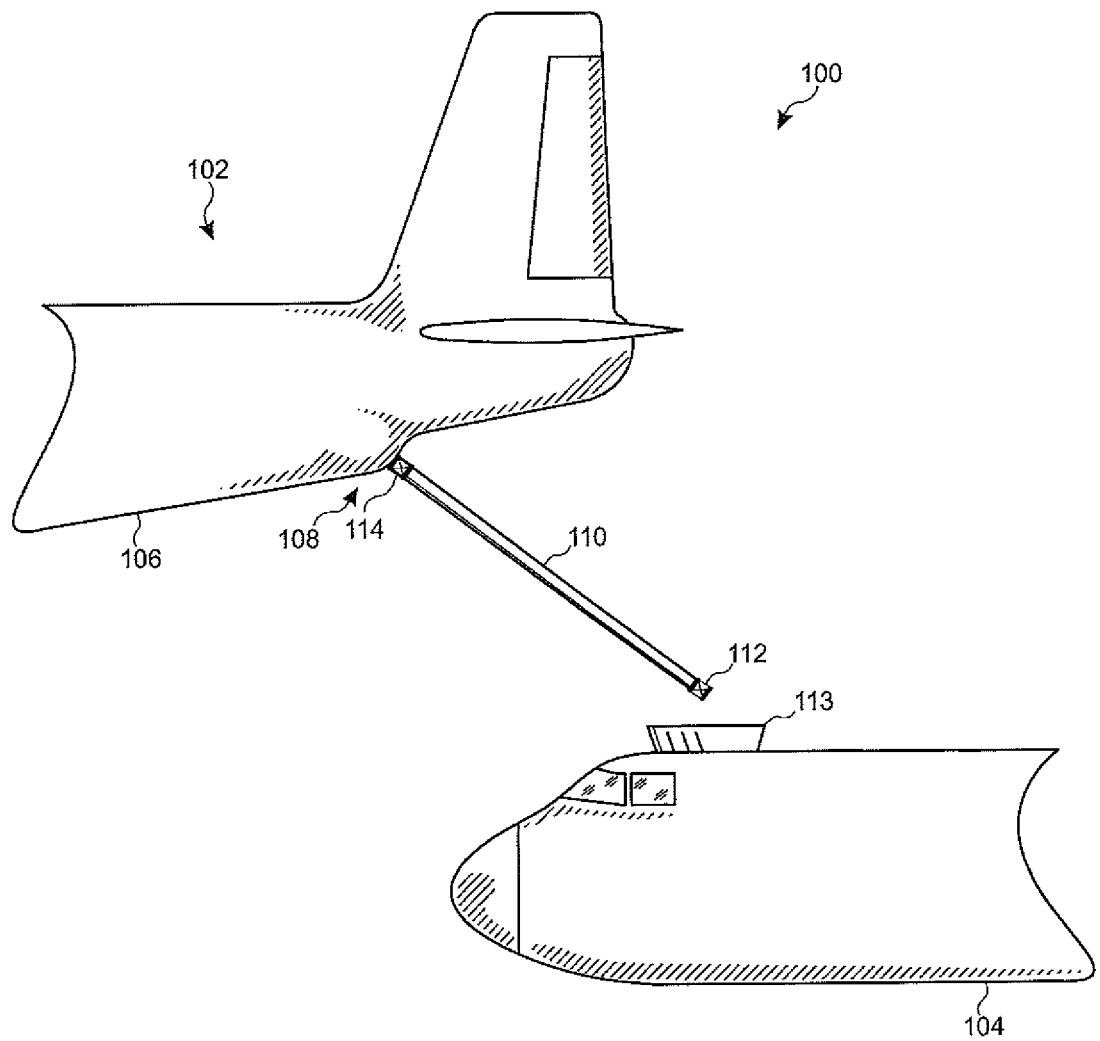
FIG. 1 is a perspective view of a tanker aircraft using a refueling boom.

Referring to FIG. 1, a refueling system 100 is shown. The refueling system 100 may include a tanker aircraft 102 which is positioned to be coupled to a receiver aircraft 104 which needs to be refueled.

The tanker aircraft 102 may have an aerial refueling device 108 attached thereto. The aerial refueling device 108 may include a refueling boom 110. The refueling boom 110 may be a retractable refueling boom. The refueling boom 110 may have a first end 110A which extends down from a fuselage 106 of the tanker aircraft 102. Located on a distal end of the refueling boom 110 may be a nozzle 112. The nozzle 112 may be used to attach the refueling boom 110 to a fuel receiving member 113 of the receiver aircraft 104.

The first end 110A of the refueling boom 110 may be attached to the fuselage 106 of the tanker aircraft 102 by a pivot mechanism 114. The pivot mechanism 114 may allow the refueling boom 110 to move in three-dimensional space. While FIG. 1 shows the pivot mechanism 114 attached to the fuselage 106, the pivot mechanism 114 may be attached to other base surfaces. Thus, for example, the pivot mechanism 114 may be formed in-line with the refueling boom 110.

Figure 2A:
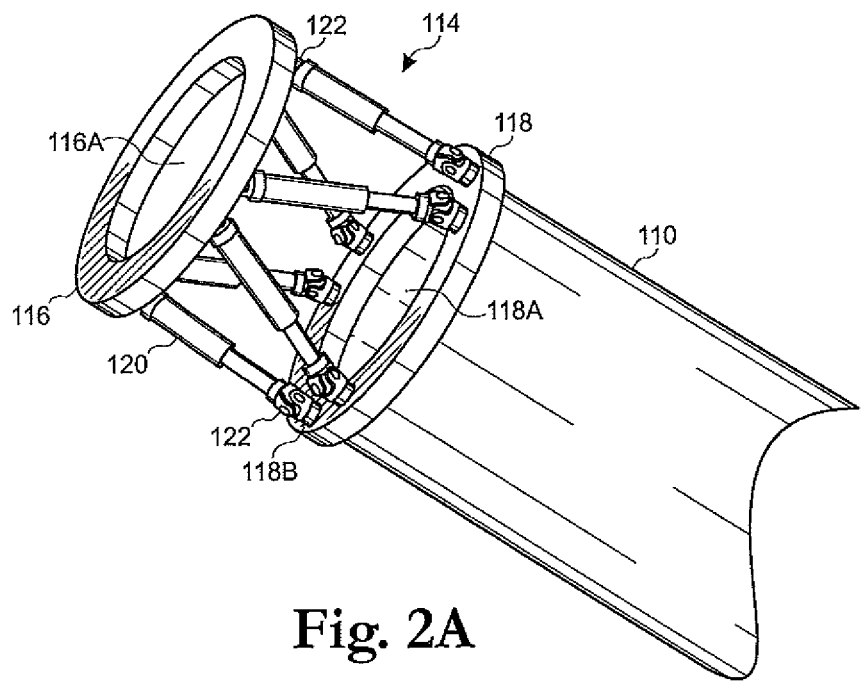
FIG. 2A is a magnified view of the pivot component of the refueling boom with a flexible conduit removed.
Figure 2B:
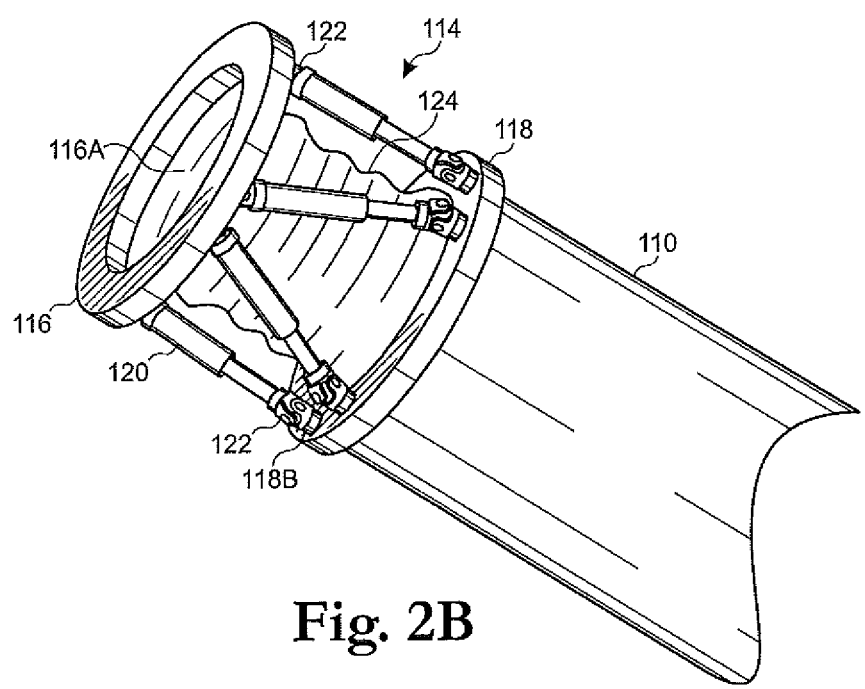
FIG. 2B is a magnified view of a pivot component of the refueling boom with the flexible conduit.
Figure 3:
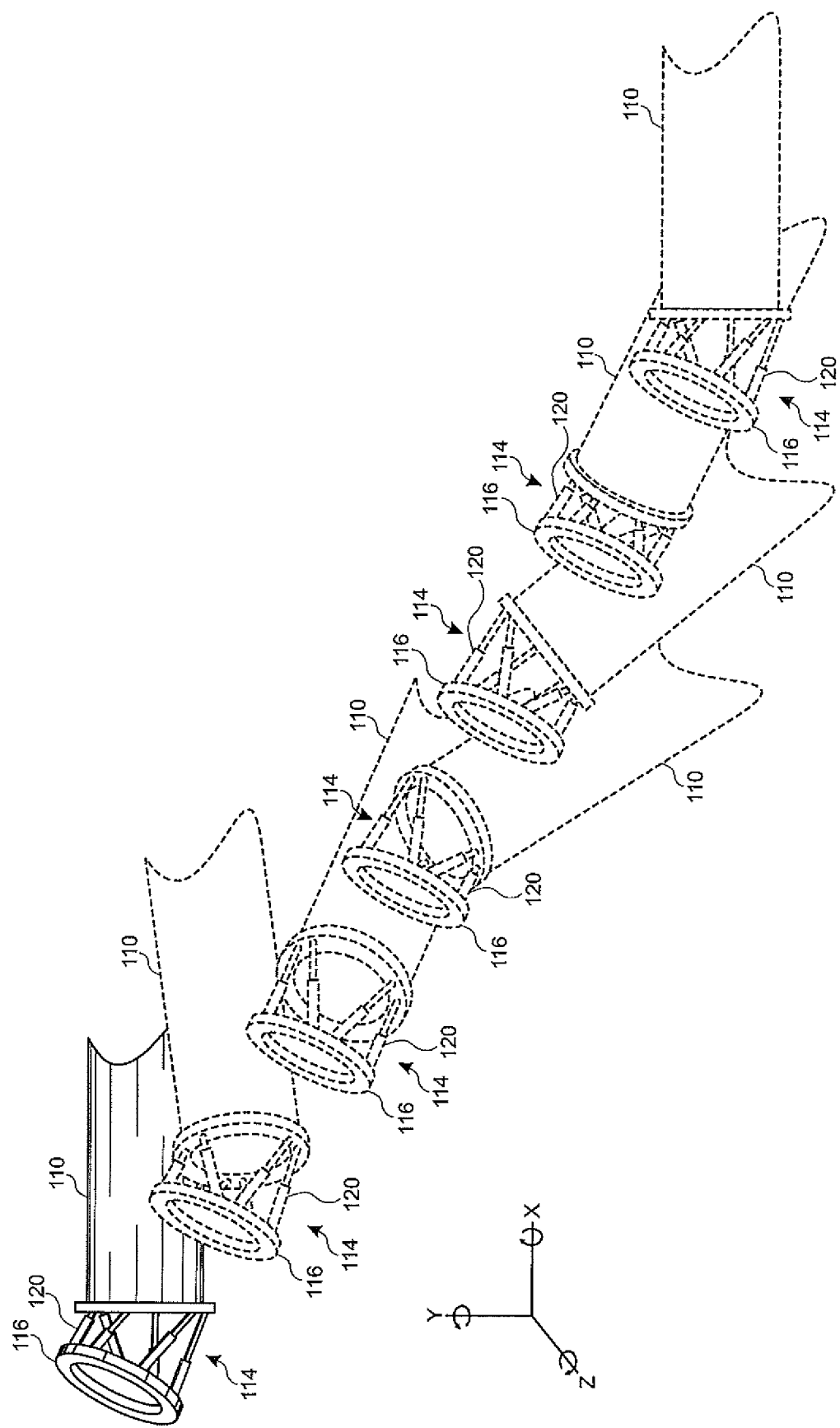
FIG. 3 depicts a movement envelope of the refueling boom.

Referring now to FIGS. 2 and 3, the pivot mechanism 114 is shown in more detail. The pivot mechanism 114 may provide six degrees of freedom for the refueling boom 110. Six degrees of freedom may allow the refueling boom 110 to move in three-dimensions. Thus, the refueling boom 110 may be able to move forward/backward, up/down, left/right, translation in three perpendicular axes, combined with rotation about three perpendicular axes: pitch, yaw, roll as shown in FIG. 3. As the movement along each of the three axes may be independent of each other and independent of the rotation about any of these axes, the motion may have six degrees of freedom.

The pivot mechanism 114 may have a first plate 116, a second plate 118, and a plurality of actuators 120. The first plate 116 may be used to secure the pivot mechanism 114 to the fuselage 106 (FIG. 1) of the tanker aircraft 102 (FIG. 1) or to other base surfaces. The first plate 116 may have an opening 116A formed there through. The opening 116A may be used to allow a fluid to flow into the pivot mechanism 114 from the tanker aircraft 102 (FIG. 1). The opening 116A may be formed in a central region of the first plate 116.

The second plate 118 may be used to secure the refueling boom 110 to the pivot mechanism 114. If the pivot mechanism 114 is formed in-line within the refueling boom 110, the second plate 118 may be used to secure the portion of the refueling boom 110 that may be movable to the pivot mechanism 114. The second plate 118 may have an opening 118A formed there through. The opening 118A may be used to allow the fluid to flow through the pivot mechanism 114 to the refueling boom 110 attached to the second plate 118. The opening 118A may be formed in a central region of the second plate 118.

A plurality of actuators 120 may be attached to the first plate 116 and second plate 118. The actuators 120 may be hydraulic actuators, electric actuators, pneumatic actuators, or the like. The listing of the above types of actuators 120 is given as an example and should not be limiting in scope. In the embodiment of FIGS. 2-3, six actuators 120 may be used. The six actuators 120 may be mounted in pairs so that a first end of each actuator 120 is mounted to the first plate 116 which may be fixed to the fuselage 106 (FIG. 1) of the tanker aircraft 100 (FIG. 1) or to other base surfaces. A second end of the actuators 120 may then be attached to corresponding mounting points 118B on the second plate 118.

Each of the actuators 120 may be rotatably attached to the first plate 116 and second plate 118. This may allow the actuators 120 to move freely relative to each other. A swivel fitting 122 may be attached to each end of the actuators 120. The swivel fitting 122 may allow the actuators 120 to be rotatable around a pivot center.

By varying the length of the actuators 120, movement may be created which may cause the second plate 118 to also move. Thus, by controlling the extension and contraction of the different actuators 120, one may be able to control the movement of the refueling boom 110 which may be attached to the second plate 118 in both azimuth and elevation about the pivot mechanism 114. Thus, the refueling boom 110 is able to move forward and backward, up and down, left and right in three perpendicular axes. The refueling boom 110 is further able to rotate about the three perpendicular axes: tilting forward and backward, pitching; turning left and right, yawing; and tilting side to side, rolling. As the movement along each of the three axes is independent of each other and independent of the rotation about any of these axes, the motion of the refueling boom 110 may have six degrees of freedom. For example, as shown in FIG. 3, when the lower actuators 120 are fully retracted and the upper actuators 120 are fully extended, the refueling boom 110 may be in a fully extended downward position. As another example, to produce a twist about an axis, the actuators 120 may have a staggered extension.

A conduit 124 may be attached between the opening 116A of the first plate 116 and the opening 118A of the second plate 118. The conduit 124 may be a flexible conduit so that a shape of the conduit 124 may be adjusted as the second plate 118 of the pivot mechanism 114 moves. The conduit 124 may be used to allow a fluid provided from the tanker aircraft 100 (FIG. 1) or other fluid source providers to flow through the second plate 118 to the refueling boom 110.

The refueling system 100 having six degrees of freedom may allow the refueling boom 110 to roll during movement which may decrease aerodynamic drag. The use of the pivot mechanism 114 between the fuselage 106 and the refueling boom 110 may allow one to control the movement of the refueling boom 110. The ability to control the refueling boom 110 having six degrees of freedom may allow for the removal of or reduction in size and shape of the control surfaces used to control movement of past refueling booms.

While embodiments of the disclosure have been described in terms of various specific embodiments, those skilled in the art will recognize that the embodiments of the disclosure can be practiced with modifications within the spirit and scope of the claims.

What is claimed is:

1. An aerial refueling system comprising:
a first plate directly attached to a fuselage of a refueling aircraft, the first plate having a first and second surface with a first plate central opening formed there through;
a second plate having a first and second surface with a second plate central opening formed there through;
a refueling boom attached to the first surface of the second plate, the refueling boom aligned with the second plate central opening;
a fluid conduit attached to the first plate and the second plate and aligned with the first plate central opening and the second plate central opening to allow a fluid to flow between the first plate and the second plate to the refueling boom; and
a plurality of actuators, wherein each actuator is rotatably coupled to both the second surface of the first plate and the second surface of the second plate to provide multi-axial movement such that each actuator can move independently in multiple planes to move the refueling boom in a three perpendicular axes system to provide six degrees of freedom in movement relative to the fuselage of a refueling aircraft.

2. An aerial refueling system in accordance with claim 1, wherein the plurality of actuators comprises a plurality of pairs of actuators.

3. An aerial refueling system in accordance with claim 1, further comprising a plurality of swivel fittings to couple the plurality of actuators to the first plate and the second plate and to allow each of the plurality of actuators to move freely relative to each other and to freely rotate in multiple planes around a pivot center.

4. An aerial refueling system in accordance with claim 1, wherein the plurality of actuators comprises six actuators.

5. An aerial refueling device comprising:
a refueling boom; and
a pivot device coupled to the refueling boom and to a refueling aircraft to provide six degrees of freedom in movement for the refueling boom relative to the refueling aircraft, wherein the pivot device comprises:
an airplane connector plate having an airplane connector plate first surface directly coupled to the refueling aircraft;
a refueling boom connector plate having a refueling boom connector plate first surface coupled to the refueling boom;
a fluid conduit attached to an airplane connector plate second surface and a refueling boom connector plate second surface to allow a fluid to flow between the first plate and the second plate to the refueling boom;
six actuators coupled to the airplane connector plate second surface and the conduit connector plate second surface; and
a plurality of swivel fittings, wherein an individual swivel fitting is coupled to each end of each of the six actuators to couple the six actuators to the airplane connector plate and the refueling boom connector plate and to allow each of the six actuators to move freely relative to each other and to freely rotate in multiple planes around a pivot center.

6. The aerial refueling device of claim 5, wherein the six actuators are arrange in three pairs of actuators.

7. The aerial refueling device of claim 6, further comprising:
a first opening formed through the airplane connector plate; and
a second opening formed through the conduit connector plate;
wherein the first opening and the second opening allow a fluid to flow through the pivot device to the refueling boom.

8. An aerial refueling device comprising:
a first connector plate having a first surface directly attached to a refueling aircraft and having a first connector central opening formed there through;
three pairs of actuators rotatably coupled to a second surface of the first connector plate;
a second connector plate having a second surface rotatably coupled to the three pairs of actuators and having a second connector plate central opening formed there through;
a plurality of swivel fittings, wherein an individual swivel fitting is coupled to each end of each actuator of the three pairs of actuators to rotatably couple each actuator to the second surface of the first connector plate and the second surface of the second connector plate and to allow each of the three pairs of actuators to move freely relative to each other and to freely rotate around a pivot center about multiple planes to provide six degrees of freedom;

a refueling boom coupled to a first surface of the second connector plate and aligned with the a second connector plate central opening; and a fluid conduit attached between the first connector plate and the second connector plate to allow a fluid to flow from the refueling aircraft to the refueling boom.

\* \* \* \* \*